US010672414B2

(12) United States Patent
Tashev et al.

(10) Patent No.: US 10,672,414 B2
(45) Date of Patent: Jun. 2, 2020

(54) SYSTEMS, METHODS, AND COMPUTER-READABLE MEDIA FOR IMPROVED REAL-TIME AUDIO PROCESSING

(71) Applicant: Microsoft Technology Licensing, LLC, Redmond, WA (US)

(72) Inventors: Ivan Jelev Tashev, Kirkland, WA (US); Shuayb M Zarar, Redmond, WA (US); Yan-Hui Tu, Hefei (CN); Chin-Hui Lee, Brookhaven, GA (US); Han Zhao, Pittsburgh, PA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 15/952,353

(22) Filed: Apr. 13, 2018

(65) Prior Publication Data

US 2019/0318755 A1    Oct. 17, 2019

(51) Int. Cl.
*G10L 21/02* (2013.01)
*G10L 25/30* (2013.01)
(Continued)

(52) U.S. Cl.
CPC ........ *G10L 21/0205* (2013.01); *G06N 3/0454* (2013.01); *G06N 3/08* (2013.01); *G10L 25/30* (2013.01); *G10L 25/84* (2013.01)

(58) Field of Classification Search
CPC combination set(s) only.
See application file for complete search history.

(56) References Cited

U.S. PATENT DOCUMENTS

| 6,446,038 B1 * | 9/2002 | Bayya | G10L 25/69 704/231 |
| 10,283,140 B1 * | 5/2019 | Yu | G06N 3/00 |

(Continued)

FOREIGN PATENT DOCUMENTS

CN    107845389 A    3/2018

OTHER PUBLICATIONS

Xu et al; Multi-objective Learning and Mask-based Post-processing for Deep Neural Network based Speech Enhancement; National Engineering Laboratory for Speech and Language Information Processing, University of Science and Technology of China, China. (Year: 2017).*

(Continued)

*Primary Examiner* — Abul K Azad
(74) *Attorney, Agent, or Firm* — Faegre Drinker Biddle & Reath LLP

(57) ABSTRACT

Systems, methods, and computer-readable storage devices are disclosed for improved real-time audio processing. One method including: receiving audio data including a plurality of frames having a plurality of frequency bins; calculating, for each frequency bin, an approximate speech signal estimation based on the plurality of frames; calculating, for each approximate speech signal estimation, a clean speech estimation and at least one additional target including an ideal ratio mask using a trained neural network model; and calculating, for each frequency bin, a final clean speech estimation using the calculated at least one additional target including the calculated ideal ratio mask and the calculated clean speech estimation.

20 Claims, 8 Drawing Sheets

(51) Int. Cl.
G06N 3/04 (2006.01)
G06N 3/08 (2006.01)
G10L 25/84 (2013.01)

(56) References Cited

U.S. PATENT DOCUMENTS

| | | | |
|---|---|---|---|
| 2014/0211965 A1* | 7/2014 | Hetherington | G10L 21/0208 381/94.2 |
| 2016/0078880 A1 | 3/2016 | Avendano et al. | |
| 2018/0033449 A1 | 2/2018 | Theverapperuma et al. | |
| 2019/0122689 A1* | 4/2019 | Jain | G06N 3/08 |
| 2019/0132687 A1* | 5/2019 | Santos | G10L 15/16 |

OTHER PUBLICATIONS

Adavanne et al.; Sound event detection using spatial features and convolutional recurrent neural network; Department of Signal Processing, Tampere University of Technology; pp. 771-775. (Year: 2017).*

Guo, et al., "A Speech Enhancement Algorithm Using Computational Auditory Scene Analysis with Spectral Subtraction", In Proceedings of the IEEE International Symposium on Signal Processing and Information Technology, Dec. 12, 2016, 5 Pages.

"International Search Report and Written Opinion Issued in PCT Application No. PCT/US19/025089", dated Jun. 4, 2019, 12 Pages.

Agarwal, et al., "An Introduction to Computational Networks and the Computational Network Toolkit", In Microsoft Technical Report MSR-TR-2014-112, Draft v1.0, Feb. 17, 2016, 150 Pages.

Boll, Steven F., "Suppression of Acoustic Noise in Speech Using Spectral Subtraction", In Journal of IEEE Transactions on Acoustics, Speech, and Signal Processing, vol. 27, Issue 2, Apr. 1979, pp. 113-120.

Du, et al., "A Speech Enhancement Approach Using Piecewise Linear Approximation of an Explicit Model of Environmental Distortions", In Proceedings of Annual Conference of International Speech Communication Association, Sep. 22, 2008, pp. 569-572.

Ephraim, et al., "Speech Enhancement Using a Minimum Mean-Square Error Log-Spectral Amplitude Estimator", In Journal of IEEE Transactions on Acoustics, Speech, and Signal Processing, vol. 33, Issue 2, Apr. 1985, pp. 443-445.

Ephraim, et al., "Speech Enhancement Using a Minimum-Mean Square Error Short-Time Spectral Amplitude Estimator", In Journal of IEEE Transactions on Acoustics, Speech, and Signal Processing, vol. 32, Issue 6, Dec. 1984, pp. 1109-1121.

McAulay, et al., "Speech Enhancement Using a Soft-Decision Noise Suppression Filter", In Journal of IEEE Transactions on Acoustics, Speech, and Signal Processing, vol. 28, Issue 2, Apr. 1980, pp. 137-145.

Mirsamadi, et al., "A Causal Speech Enhancement Approach Combining Data-driven Learning and Suppression Rule Estimation", In Proceedings of InterSpeech, May 8, 2016, 5 Pages.

Rix, et al., "Perceptual Evaluation of Speech Quality (PESQ): An Objective Method for End-to-End Speech Quality Assessment of Narrow-Band Telephone Networks and Speech Codecs", In International Telecommunications Union Std, Jan. 2001, pp. 1-4.

Seide, et al., "Conversational Speech Transcription using Context-Dependent Deep Neural Networks", In Proceedings of 12th Annual Conference of the International Speech Communication Association, Aug. 28, 2011, pp. 437-440.

Servan-Schreiber, et al., "Learning Sequential Structure in Simple Recurrent Networks", In Proceedings of Advances in Neural Information Processing Systems, Nov. 27, 1989, pp. 643-652.

Tashev, Ivan J., "Sound Capture and Processing: Practical Approaches", In Publication of Wiley, Jul. 2009, 15 Pages.

Tu, et al., "Speech Separation Based on Improved Deep Neural Networks with Dual Outputs of Speech Features for both Target and Interfering Speakers", In Proceedings of 9th International Symposium on Chinese Spoken Language Processing, Sep. 12, 2014, pp. 250-254.

Vincent, et al., "Performance Measurement in Blind Audio Source Separation", In Journal of IEEE Transactions on Audio, Speech, and Language Processing, vol. 14, Issue 4, Jul. 2006, pp. 1462-1469.

Wang, et al., "On Training Targets for Supervised Speech Separation", In Journal of IEEE/ACM Transactions on Audio, Speech, and Language Processing, vol. 22, Issue 12, Dec. 2014, pp. 1849-1858.

Wang, et al, "Towards Scaling Up Classification-Based Speech Separation", In Journal of IEEE Transactions on Audio, Speech, and Language Processing, vol. 21, Issue 7, Jul. 2013, pp. 1381-1390.

Weninger, et al., "Discriminatively Trained Recurrent Neural Networks for Single-Channel Speech Separation", In Proceedings of IEEE Global Conference on Signal and Information Processing, Dec. 3, 2014, pp. 577-581.

Weninger, et al., "Single-Channel Speech Separation with Memory-Enhanced Recurrent Neural Networks", In Proceedings of IEEE International Conference on Acoustics, Speech and Signal Processing, May 4, 2014, pp. 3709-3713.

Xu, et al., "A Regression Approach to Speech Enhancement Based on Deep Neural Networks", In Journal of IEEE/ACM Transactions on Audio, Speech, and Language Processing, vol. 23, Issue 1, Jan. 2015, pp. 7-19.

* cited by examiner

Noisy

Clean

DNN-LPS

IMCRA

ISPP

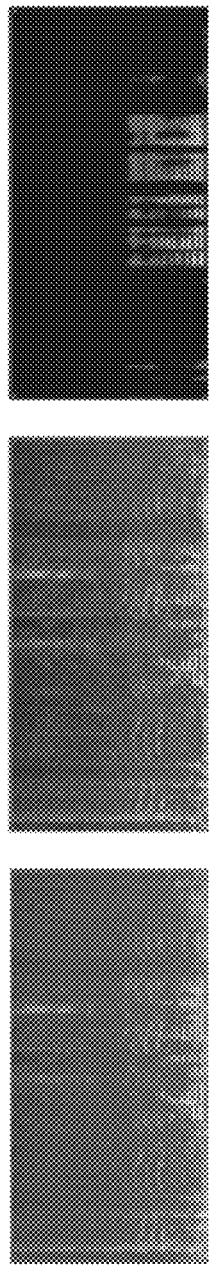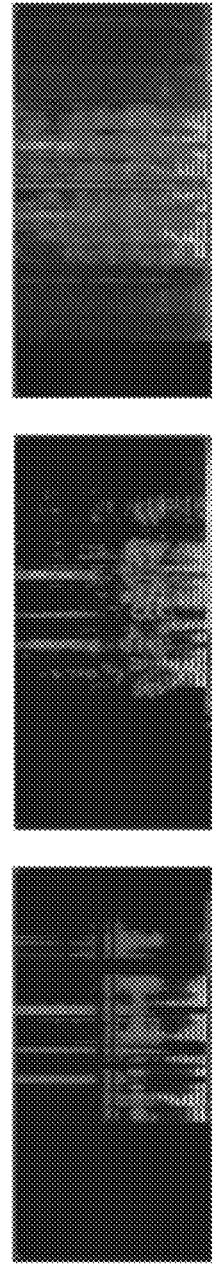
Figure 5A Noisy speech
Figure 5B MS
Figure 5C DNN
Figure 5D RNN
Figure 5E EHNet
Figure 5F Clean speech

SYSTEMS, METHODS, AND COMPUTER-READABLE MEDIA FOR IMPROVED REAL-TIME AUDIO PROCESSING

TECHNICAL FIELD

The present disclosure relates to audio processing that improves in real-time audio quality, speech recognition, and/or speech detection. Specifically, the present disclosure relates to real-time audio processing using statistical signal-processing algorithms, machine learning, time-domain information, frequency domain information, and/or conversion domain information to improve enhancement and/or detection of speech and noise in audio data.

INTRODUCTION

Speech-enhancement techniques may employ statistical signal-processing algorithms, which may be computationally efficient and improve speech quality even under unknown noise conditions. Such speech-enhancement techniques may be preferable for deployment in unpredictable environments where unknown noise conditions may exist. However, speech-enhancement techniques employing statistical signal-processing algorithms may fail to suppress non-stationary noise. Algorithms based on deep-learning may overcome the failure to suppress non-stationary noise. However, algorithms based on deep-learning may underperform when presented with noise conditions that were not captured in a training data set.

Thus, a single-channel speech-enhancement technique that combines the benefits of speech-enhancement techniques employing statistical signal-processing algorithms with algorithms based on deep-learning may achieve improved listening-quality and recognition-accuracy under conditions of noise that are both unknown and non-stationary. A speech-enhancement technique employing statistical signal-processing algorithm may be used to produce an intermediate representation of input data by multiplying noisy input spectrogram features with gain vectors (also known as the suppression rule). The intermediate representation of input data may then be processed through algorithms based on deep-learning, such as a recurrent neural-network based on long short-term memory ("LSTM") units. Further, a recurrent neural-network based on LSTM units may be trained to jointly learn two targets: a direct estimate of clean-speech features and a noise-reduction mask.

Other algorithms based on deep-learning may include an end-to-end model based on convolutional neural networks and recurrent neural networks for speech enhancement. The end-to-end model may be data-driven, and may not make any assumptions about the type of noise or the stationarity of noise. Employing both convolutional and recurrent neural network architectures may allow exploitation of local structures in the time, frequency, and/or conversion domains. Further, by incorporating prior knowledge of speech signals into the design of model structures, such an end-to-end model may be more data-efficient and may achieve better generalization on both seen and unseen noise.

While the present disclosure specifically discusses audio processing, aspects of the present disclosure may be applicable not only to audio processing but may also be applicable to regressive processing and classification problems.

SUMMARY OF THE DISCLOSURE

According to certain embodiments, systems, methods, and computer-readable media are disclosed for improved real-time audio processing.

According to certain embodiments, a computer-implemented method for improved real-time audio processing is disclosed. One method including: receiving audio data including a plurality of frames having a plurality of frequency bins; calculating, for each frequency bin, an approximate speech signal estimation based on the plurality of frames; calculating, for each approximate speech signal estimation, a clean speech estimation and at least one additional target including an ideal ratio mask using a trained neural network model; and calculating, for each frequency bin, a final clean speech estimation using the calculated at least one additional target including the calculated ideal ratio mask and the calculated clean speech estimation.

According to certain embodiments, a system for improved real-time audio processing is disclosed. One system including: a data storage device that stores instructions for improved real-time audio processing; and a processor configured to execute the instructions to perform a method including: receiving audio data including a plurality of frames having a plurality of frequency bins; calculating, for each frequency bin, an approximate speech signal estimation based on the plurality of frames; calculating, for each approximate speech signal estimation, a clean speech estimation and at least one additional target including an ideal ratio mask using a trained neural network model; and calculating, for each frequency bin, a final clean speech estimation using the calculated at least one additional target including the calculated ideal ratio mask and the calculated clean speech estimation.

According to certain embodiments, a computer-readable storage device storing instructions that, when executed by a computer, cause the computer to perform a method for improved real-time audio processing is disclosed. One method of the computer-readable storage devices including: receiving audio data including a plurality of frames having a plurality of frequency bins; calculating, for each frequency bin, an approximate speech signal estimation based on the plurality of frames; calculating, for each approximate speech signal estimation, a clean speech estimation and at least one additional target including an ideal ratio mask using a trained neural network model; and calculating, for each frequency bin, a final clean speech estimation using the calculated at least one additional target including the calculated ideal ratio mask and the calculated clean speech estimation.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

FIGS. 5A-5F depict noisy and clean spectrograms, along with the denoised spectrograms using different models, according to embodiments of the present disclosure;

Figure 1:
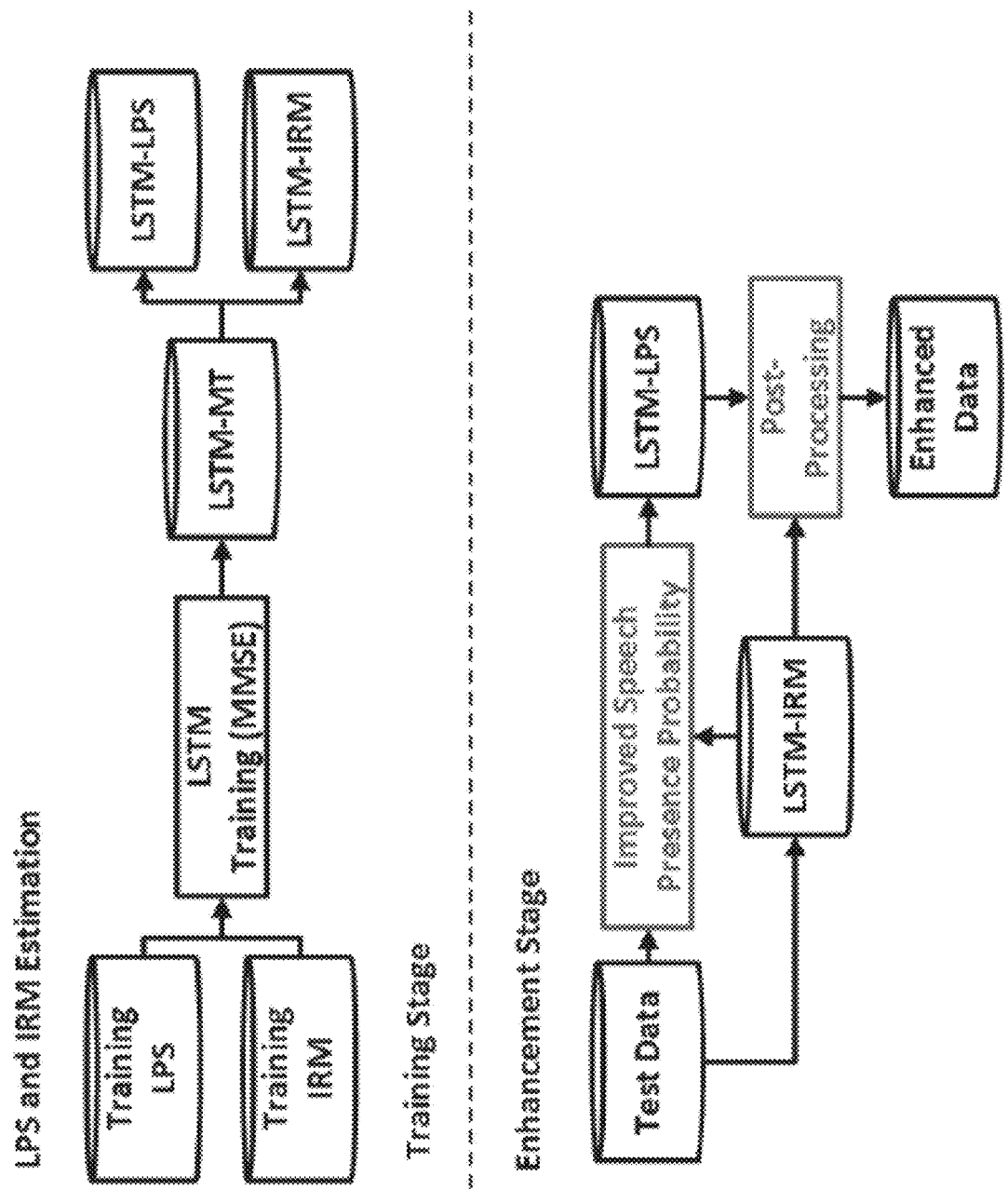
FIG. 1 depicts a block diagram of a deep learning framework, according to embodiment of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology to efficiently combine speech enhancement techniques employing statistical signal-processing algorithms with deep learning techniques for audio processing tasks, such as speech enhancement and/or speech recognition. Audio signals may be corrupted by background noise and/or interference. Speech enhancement techniques employing statistical signal-processing algorithms may be able to remove these background noise and/or interference, which may improve intelligibility by both people and/or automatic speech recognition ("ASR") engines.

Speech enhancement techniques employing statistical signal-processing algorithms may work in a conversion domain, such as the frequency domain, which may be a representation that is produced by breaking down time-domain signals into overlapping frames, weighting the overlapping frames, and transforming the overlapping frames with a short-time Fourier transform ("STFT"). These signal-processing algorithms may apply a time-varying, real-valued suppression gain to each frequency bin based on an estimated presence of speech and/or an estimated presence of noise. The time-varying, real-valued suppression gains may range between 0 and 1, where 0 may represent a where there is only noise and 1 may represent a where there is only speech.

To estimate the suppression gain, noise and speech signal magnitudes may be assumed to have a Gaussian distribution and that noise changes slower than a speech signal. A noise model may be built having noise variances for each frequency bin. The noise model may be built by using voice activity detectors ("VAD"). The suppression rule may be a function of prior and posterior signal-to-noise-ratios ("SNR"). Such suppression rules may include the Wiener suppression rule, which is optimal in mean-square error, the spectral magnitude estimator, maximum likelihood amplitude estimator, short-term minimum mean-square error ("MMSE") estimator, and log-spectral minimum mean-square error ("log-MMSE") estimator. Further, for a MMSE estimator, a prior SNR as a geometric mean of a maximum-likelihood estimate of the current and the previous frame may be computed, which may be referred to as decision-directed approach ("DDA"). After estimation of the magnitude, the signal may be converted back to the time domain using overlap-and-add. These techniques may adapt to the noise level and perform well with quasi-stationary noises, but impulse non-speech signals may not be suppressed.

When systems are built using data-driven approaches based on large scale deep neural networks, there may be a mismatch between clean data used to train the systems and the noisy data encountered when deploying the systems. Thus, speech enhancement algorithms may work as a pre-processing module that helps to reduce the noise in speech signals before audio data is fed into these systems.

By making assumptions on the nature of the underlying noise, statistical based approaches, including the spectral subtraction method, the minimum mean-square error log-spectral method, etc., may obtain analytic solutions for noise suppression. However, due to these unrealistic assumptions, statistical-based approaches may fail to build estimators that approximate the complex scenarios in real-world. As a result, additional noisy artifacts may be introduced in the recovered signals. Thus, data-driven approaches using regression-based deep neural networks may provide substantial performance improvements over statistical-based methods alone.

A supervised learning framework may solve the problem discussed above, where a deep neural network ("DNN") may be trained to map from the input to the output features. A regression DNN may be adopted using a mapping-based method directly predicting a clean spectrum from a noisy spectrum. A DNN structure with two outputs may estimate target speech and interference simultaneously. Further, a DNN may estimate ideal masks including an ideal binary mask ("IBM") for each time-frequency (T-F) bin (where a 1 may be assigned if the SNR is above a predetermined threshold, and zero otherwise) and an ideal ratio mask ("IRM") for each T-F bin (which may be defined as a ratio between powers of a target signal and mixture). The IRM may represent the suppression rule in noise suppressors, and estimating IRM may lead to better speech enhancement performance than that of IBM.

While the above described techniques may be based on fully connected DNNs, where relationship between the neighboring frames may not be explicitly modeled, recurrent neural networks ("RNNs") may use recursive structures between a previous frame and a current frame to capture the long-term contextual information, which may make a better prediction. Further, a long short-term memory recurrent neural network ("LSTM-RNN") may be used for speech enhancement, which may provide improved performance of noise reduction at low SNRs.

Deep neural networks, such as those using multilayer perceptrons ("MLPs"), may be applied as general nonlinear function approximators to approximate mapping from noisy utterance to clean versions. A multivariate regression based objective may then be optimized using numeric methods to fit model parameters. To capture the temporal nature of speech signals, recurrent neural networks, may remove the need for the explicit choice of a context window in MLPs.

As discussed in more detail below, in an end-to-end model based on convolutional and recurrent neural networks for speech enhancement, the network may be data-driven, and the network may not make any assumptions about the underlying noise. A convolutional-recurrent neural network may include three components: (i) a convolutional component, which may exploit local patterns in a spectrogram in both spatial and temporal domain; then (ii) a bidirectional recurrent component, which may model dynamic correlations between consecutive frames; and finally (iii) a fully-connected layer that predicts clean spectrograms.

The convolutional-recurrent neural network may be more data-efficient and computationally tractable when compared to MLPs and RNNs due to the sparse nature of convolutional kernels. Further, the bidirectional recurrent component may allow the convolutional-recurrent neural network to model the dynamic correlations between consecutive frames adaptively, which may achieve better generalization on both seen and unseen noise.

In embodiments of the present disclosure described below, a hybrid approach may combine the advantages of the noise suppression, such as mitigating quasi-stationary noises, and performance of the neural networks, such as LSTM or convolutional-recurrent neural networks, for suppressing fast changing noise and interference signals. For example, first, speech may be enhanced by combining statistical signal-processing algorithms with deep learning-based speech enhancement, reducing the stationary noise, where denoted as Approximate Speech Signal Estimation ("ASSE"). The suppression rule may be estimated using decision-directed approach, as a geometric mean of the suppression rule from the previous frame and the estimate for the current frame using an estimation techniques, and a clean speech estimator may preserve speech quality, but also may leave noise and interference. Then, a LSTM-based direct mapping regression model may be utilized to estimate from the enhanced speech both clean speech and the suppression rule. Output may be one or both of an estimated clean speech and/or to apply the suppression rule to the noisy speech. Alternatively, and/or additionally, a convolutional-recurrent neural network may be utilized to estimate from the enhanced speech both clean speech and the suppression rule FIG. 1 depicts a block diagram of a deep learning framework, according to embodiment of the present disclosure. At a training stage of the deep learning framework, a LSTM multi-style ("LSTM-MT") model may be trained using a log-power spectra ("LPS") of a training data set as input features, and a clean LPS and IRM as reference. As shown in FIG. 1, the LSTM-LPS and LSTM-IRM may denote the estimated clean LPS and IRM at the LSTM-MT's two outputs, respectively.

In the enhancement stage, enhancement process for an l-th audio frame may be divided into three successive steps. In a first step, which may be denoted as approximate speech signal estimation ("ASSE")(discussed below), noisy LPS X(l) may be pre-processed by computing and applying a suppression rule, which may yield a clean speech approximate estimation Y(l). In the second step, the trained LSTM-MT neural network may uses Y(l) to produce estimations of the clean speech Ŝ(l) and IRM M(l). In the third step, the estimated IRM M(l) and the approximate clean speech estimation Y(l) may be used to estimate the output speech signal Z(l).

In noise suppression, such as using statistical signal-processing algorithms, a key role may be played by prior and posterior SNRs, which may be denoted by $\xi(k,l)$ and $\gamma(k,l)$, respectively, and may be defined as follows:

$$\gamma(k, l) \triangleq \frac{|X(k, l)|^2}{\lambda(k, l)}, \quad \xi(k, l) \triangleq \frac{|S(k, l)|^2}{\lambda(k, l)} \quad (1)$$

where $\lambda(k,l)$ may denote a noise variance for time frame l and frequency bin k, and X(k,l) may be the short-time Fourier transform ("STFT") of the noisy signal.

As the clean speech amplitude may be unknown, the clean speech amplitude may be estimated using a decision directed approach as follows:

$$\xi(k, l) = \alpha \frac{|\hat{S}(k, l-1)|^2}{\lambda(k, l)} + (1 - \alpha)\max(0, \gamma(k, l) - 1) \quad (2)$$

Here, the fact that consecutive speech frames are highly correlated may be utilized, which may allow using clean speech amplitude estimation from a previous frame. An output may be 0 where there is mostly noise and may be much higher than one where there is mostly speech.

Accordingly, the suppression rule may be a function of the prior and posterior SNRs as follows:

$$G(k,l)=g(\gamma(k,l),\xi(k,l)) \quad (3)$$

Then, the estimated suppression rule may be applied to a noisy signal to receive the clean speech estimation as follows:

$$\hat{S}(k,l)=G(k,l)X(k,l) \quad (4)$$

The noise model may be updated after processing of each frame:

$$\lambda(k, l+1) = \lambda(k, l) + (1 - P(k, l))\frac{T}{\tau_N}(|X(k, l)|^2 - \lambda(k, l)) \quad (5)$$

where T may be the frame step, $\tau_N$ may be the adaptation time constant, and P(k,l) may be the speech presence probability. The last may be either estimated by a VAD and/or approximated by the suppression rule G(k,l).

After processing input data for noise suppression, such as using statistical signal-processing algorithms, to estimate prior and posterior SNRs, which are be denoted by ξ(k,l) and γ(k,l), above formulas (2) and (1), respectively, the suppression rule G(k,l) may be estimated (formula (3)). Then, the suppression rule may be combined with the IRM, which may be estimated by the LSTM-MT, and the approximate speech signal estimation ("ASSE") may be computed as pre-processing for LSTM-LPS as follows:

$$Y(k,l)=\log[\delta M(k,l)+(1-\delta)G(k,l)]+X(k,l) \quad (6)$$

In order to work with LPS, a logarithm of the suppression rule may be used, and the multiplication of formula (4) becomes a summation. Formula As shown in FIG. 1, during inference time, the LSTM-IRM model may be run first to estimate the IRM alone. Then, the estimated IRM may be combined, as shown in formula (6). Thus, neural network model may be run twice on the same data-frame, i.e., once to estimate IRM and once more for LPS.

Figure 2:
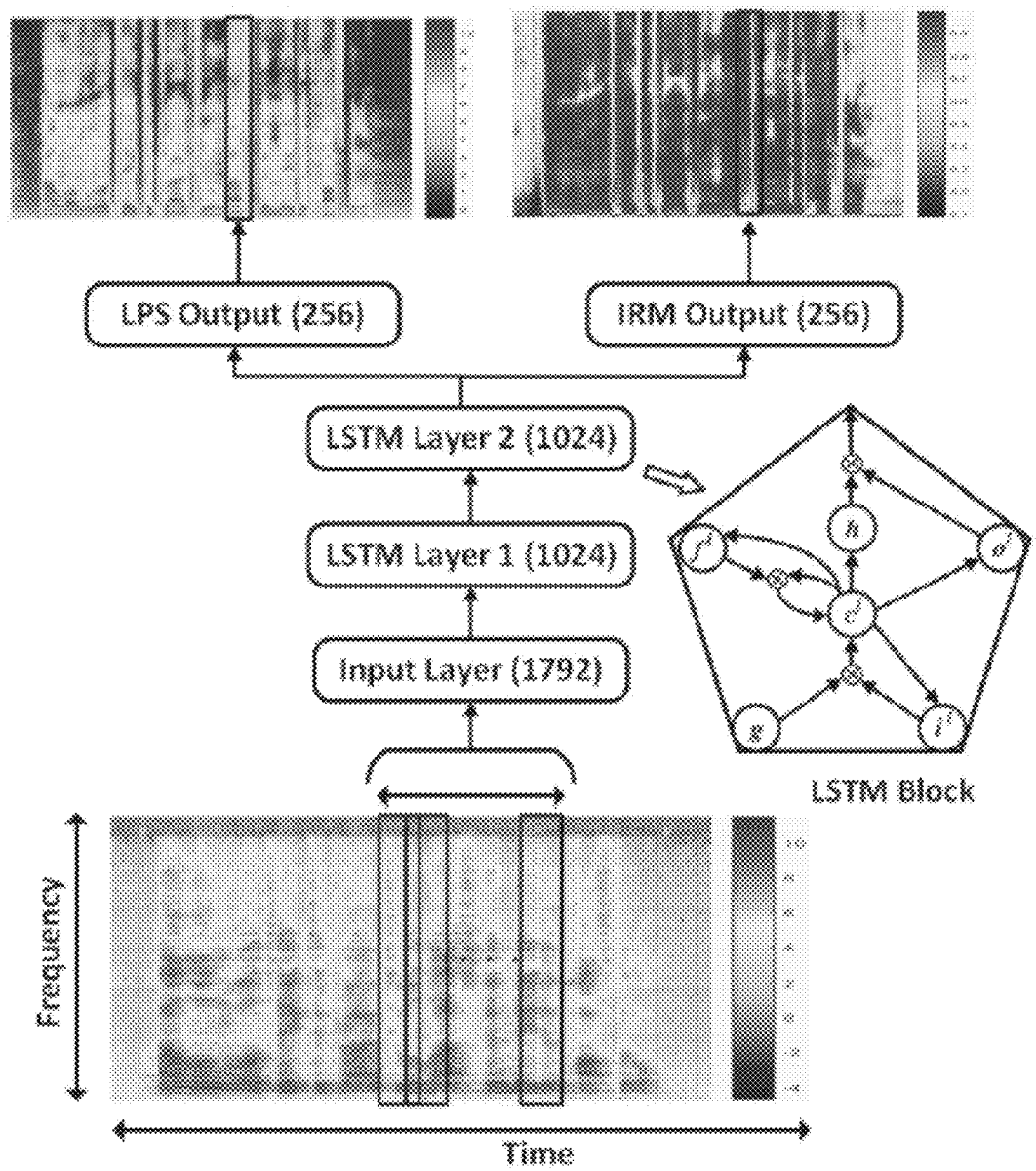
FIG. 2 depicts a structure of the LSTM-MT model, which is a LSTM-based multi-target deep learning block, according to embodiments of the present disclosure.

FIG. 2 depicts a structure of the LSTM-MT model, which is a LSTM-based multi-target deep learning block, according to embodiments of the present disclosure. The LSTM-based multi-target deep learning block may be trained to learn the complex transformation from the noisy LPS features to clean LPS and IRM.

Acoustic context information along a segment of several neighboring audio frames and all frequency bins may be fully exploited by LSTM to obtain LPS and IRM estimates in adverse environments. The estimated IRM may be restricted to be in a range between 0 and 1, where 0 may represent a where there is only noise and 1 may represent a where there is only speech. The estimated IRM may be directly used to represent a speech presence probability. The IRM as a learning target may be defined as a proportion of the powers of clean and noisy speech in the corresponding T-F bin as follows:

$$M_{ref}(k, l) = \frac{|S(k, l)|^2}{|X(k, l)|^2} \quad (7)$$

As shown in FIG. 2, the neural network may require a synthetic data set with separately known clean speech and noise signals in order to be trained. To train the LSTM-MT model, supervised fine-tuning may be used to minimize a mean square error ("MSE") between both the LSTM-LPS output Ŝ(k,l) and the reference LPS S(k,l), and the LSTM-IRM output M(k,l) and the reference IRM $M_{ref}$(k,l), which may be defined as follows:

$$E_{MT}=\Sigma_{k,l}[(\hat{S}(k,l)-S(k,l))^2+(M(k,l)-M_{ref}(k,l))^2] \quad (8)$$

The MSE may be minimized using a stochastic gradient descent based back-propagation method in a mini-batch mode.

The LSTM-IRM output M(k,l) may be utilized for post-processing via a simple weighted average operation in LPS domain as follows:

$$Z(k,l)=\eta Y(k,l)+(1-\eta)\{X(k,l)+\log[M(k,l)]\} \quad (9)$$

The output Z(k,l) may be directly fed to a waveform reconstruction module. The output of the LPS domain may be more effective than that in a linear spectral domain. A summary of the combined noise suppression and LSTM-based method is presented in the following algorithm.

---

Algorithm: Speech enhancement algorithm using combination of noise suppression and multi-style trained LSTM Input: Log-power spectrum of the noisy signal X (k, l)
Output: Log-power spectrum of the estimated clean speech signal Z (k, l)
 1:   for all short-time FFT frames l = 1, 2,..., L do
 2:      for all frequency bins k = 1, 2,..., K do
 3:         Compute the posterior SNR γ (k, l) using formula
           (1), and the prior SNR ξ (k, l) using formula (2).
 4:         Compute the suppression gain G (k, l) using
           formula (3).
 5:         Compute the approximate speech estimation
           Y (k, l) following formula (6)
 6:      end for
 7:      Feed Y(l) into LSTM-MT and obtain the clean speech estimation Ŝ(l) and IRM M(l)
 8:      for all frequency bins k = 1, 2,..., K do
 9:         Use the estimated IRM M (k, l) and clean speech approximate estimation Y (k, l) to obtain final estimated speech Z (k, l) using formula (9).
10:      end for
11: end for

---

While FIGS. 1 and 2 depict a neural network framework, those skilled in the art will appreciate that neural networks may be conducted in regard to a model and may include phases: model creation (neural network training), model validation (neural network testing), and model utilization (neural network evaluation), though these phases may not be mutually exclusive. According to embodiments of the present disclosure, neural networks may be implemented through training, inference, and evaluation stages. Noisy speech spectrogram windows may be utilized. For a baseline deep neural network, as shown in FIG. 2, the model may have input layer of 1792 neurons, two intermediate (hidden)

layers (LSTM layer 1 and LSTM layer 2) each of 1024 neurons, and two output layers having 256 neurons.

At least one server may execute a machine learning component of the audio processing system described herein. As those skilled in the art will appreciate, machine learning may be conducted in regard to a model and may include at least three phases: model creation, model validation, and model utilization, though these phases may not be mutually exclusive. As discussed in more detail below, model creation, validation, and utilization may be on-going processes of a machine learning.

For the machine learning, the model creation phase may involve extracting features from noisy speech of a training data set. The machine learning component may monitor the ongoing audio data to extract features from noisy speech. As those skilled in the art will appreciate, these extracted features and/or other data may be derived from statistical analysis and machine learning techniques on large quantities of data collected over time based on patterns. Based on the observations of this monitoring, the machine learning component may create a model (i.e., a set of rules or heuristics) for extracting features from audio data. As discussed above, the deep neural network may be trained to minimize squared error.

During a second phase of machine learning, the model created during the model creation phase may be validated for accuracy. During this phase, the machine learning component may monitor a noisy speech from a test data set, extract features from the test data set, and compare those extracted features against predicted labels made by the model. Through continued tracking and comparison of this information and over a period of time, the machine learning component may determine whether the model accurately predicts which parts of the audio data are likely to be noise and/or speech. This validation is typically expressed in terms of accuracy: i.e., what percentage of the time does the model predict the labels. Information regarding the success or failure of the predictions by the model may be fed back to the model creation phase to improve the model and, thereby, improve the accuracy of the model.

For performance comparison, performance metrics of various audio processing techniques are obtained. Table 1, as shown below, provides a comparison of word error rates ("WER") in percentage, sentence error rates ("SER") in percentage, and perceptual evaluation of speech quality ("PESQ") in a range from 1 to 5 with 1 being poor and 5 being excellent, with different approaches and test sets.

TABLE 1

| | Algorithm | WER (in %) | SER (in %) | PESQ (0-5) |
|---|---|---|---|---|
| 1 | No processing | 15.86 | 26.07 | 2.65 |
| 2 | +LSTM-LPS | 10.34 | 19.60 | 3.37 |
| 3 | Noise Suppressor | 14.24 | 24.60 | 2.69 |
| 4 | +LSTM-LPS | 10.51 | 19.27 | 3.36 |
| 5 | ASSE | 12.63 | 22.67 | 2.71 |
| 6 | +LSTM-LPS | 9.22 | 18.13 | 3.41 |
| 7 | +LSTM-IRM | 8.29 | 16.93 | 3.30 |

A third phase of machine learning may be based on a model that is validated to a predetermined threshold degree of accuracy. For example, a model that is determined to have at least a 50% accuracy rate may be suitable for the utilization phase. According to embodiments of the present disclosure, during this third, utilization phase, the machine learning component may extract features from audio data where the model suggests that a noise and/or speech is present. Upon encountering speech and/or other data in the audio data, the model suggests that speech may be present and may store as segments of data. Of course, information based on the confirmation or rejection of the various stored segments of data may be returned back to the previous two phases (validation and creation) as data to be used to refine the model in order to increase the model's accuracy.

The data sets, as used herein, for evaluation of the speech enhancement algorithm were synthetically generated. A clean speech corpus includes 134 recordings, with 10 single sentence utterances each, pronounced by male, female, and children voices in approximately equal proportion. An average duration of these recordings is around 1 minute and 30 seconds. The noise corpus includes 377 recordings, each 5 minutes long, representing 25 types of noise (airport, cafe, kitchen, bar, etc.). 48 room impulse responses ("RIR"), obtained from a room with $T_{60}$=300 ms and distances between the speaker and the microphone varying from 1 to 3 meters, were used. To generate a noisy file a clean speech file was randomly selected, and the clean speech file's level according to a human voice loudness model was set (Gaussian distribution $\mu_s$=65 dB SPL @1 m, $\sigma_s$=8 dB). A RIR was then randomly selected, and the speech signal was convolved with the RIR to generate a reverberated speech signal. Lastly, a noise file was randomly selected, the noise file's level according to a room noise model was set (Gaussian distribution $\mu_N$=50 dB SPL, $\sigma_N$=10 dB), and add the noise file was added to the reverberated speech signal.

A resulting file SNR may be limited to the range of [0,+30] dB. All signals were sampled at 16 kHz sampling rate and stored with 24 bits precision. 120 dB clipping level of the microphone was assumed. Using this approach, 7,500 noisy files for training, 150 for verification, and 150 for testing were generated. A total length of the training data set is 100 hours.

For evaluation of the output signal quality, as perceived by humans, PESQ algorithm was used, as shown in Table 1. PESQ is standardized as IUT-T Recommendation P. 862. For testing of the speech enhancement algorithm, a DNN-based speech recognizer was used. As mentioned above, the speech recognition results are evaluated using word error rate ("WER") and sentence error rate ("SER").

For the structure and training of the LSTM-MT network, the frame length and shift were 512 and 256 samples, respectively, which yields 256 frequency bins for each frame. Log-power spectrum may be computed as features, and the phase is preserved for waveform reconstruction. The input feature to the LSTM-MT network may be prepared by flattening symmetric seven frame windows of a spectrogram. The seven frame spectrogram window includes three frames before and three frames after the current frame.

As mentioned above, the LSTM-MT model may have input layer of 1792 neurons (256*7 dimension vector for LPS input features, two intermediate (hidden) layers (LSTM Layer 1 and LSTM Layer 2, as shown in FIG. 2) each of 1024 neurons, and two output layers having 256 neurons each (512 combined). 512 neurons for the output T-F LPS and IRM, respectively. Two 256-dimensional feature vectors were used for LPS and IRM targets.

The entire deep neural framework may be implemented using a computational network toolkit ("CNTK"), and model parameters may be randomly initialized. For the first ten epochs a learning rate may be initialized as 0.01, and then may be decreased by 0.9 after each epoch. The number of epochs may be fixed to 45. Each backpropagation through time ("BPTT") segment may include 16 frames and 16 utterances, which may be processed simultaneously.

For the noise suppressor $\alpha=0.9$ may be used in formula (2), the time constant $\tau_N=1$ sec may be used in formula (5), weighting average with $\delta=0.5$ may be used in formula (6), and $\eta=0.5$ may be used in formula (9). For suppression rule estimation in formula (3), log-MMSE suppression rule may be used.

As mentioned above, experimental results are presented in Table 1. FIGS. 3A-3E depict spectrograms using different enhancement approaches, according to embodiments of the present disclosure.

"No processing" in the row 1 of Table 1 contains the evaluation of a data set without any processing, which may provide baseline numbers for comparison to the different enhancement approaches. Baseline numbers include 15.86% WER and 2.65 PESQ. Applying a noise suppressor, as shown is row 2 of Table 1, WER may be reduced to 14.24% and PESQ may increase to 2.69.

Rows 2 and 4 of Table 1 lists the average WER, SER, and PESQ for straightforward estimation of LPS. In a first case (row 2 of Table 1), the input for the LSTM-MT network may be a noisy signal. In a second case (row 4 of Table 1), the input for the LSTM-MT may be input after processing with classic noise suppressor. WER may be reduce to 10.34% in the first case and PESQ may be increased to 3.37. The results after using the noise suppression with the LSTM may be negligibly worse.

Row 5 of Table 1 shows approximate speech signal estimation ("ASSE") based results when IRM estimated from noisy speech by LSTM-IRM and noise suppression methods are combined. WER may be reduced to 12.63% and PESQ may be increased to 2.71.

Results for using ASSE based enhanced speech as pre-processing for straightforward estimation of LPS is shown in row 6 of Table 1. The LPS output $\hat{S}(l)$ of the LSTM-MT neural network may be used for waveform synthesis, and WER may be reduced to 9.22% and PESQ may increase to 3.41.

Finally, row 7 of Table 1 depicts results of full algorithm combining noise suppression with LSTM-MT, as described above. The IRM output of the LSTM-MT neural network may be used for the waveform synthesis to estimate Z(l) as described in formula (9), and WER may be reduced to 8.29%, which is 47.73% a relative WER improvement. Further, using this algorithm substantially, PESQ increases to 3.30.

Figure 3A:
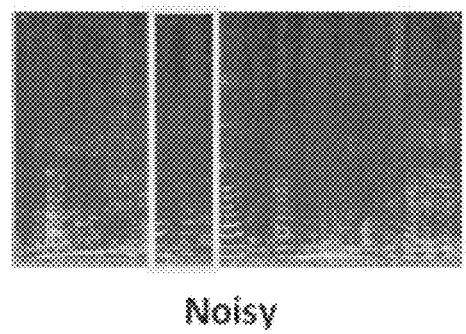
FIGS. 3A-3E depict spectrograms using different enhancement approaches, according to embodiments of the present disclosure.
Figure 3B:
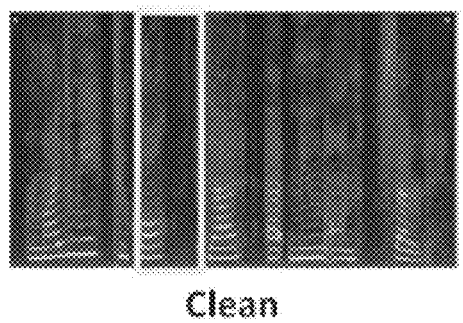
Figure 3C:
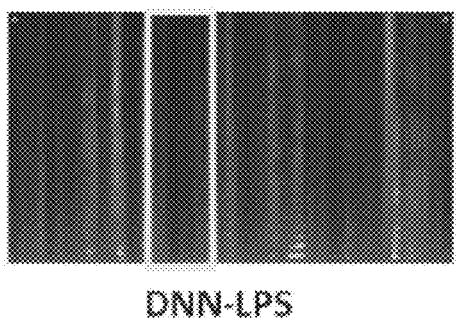
Figure 3D:
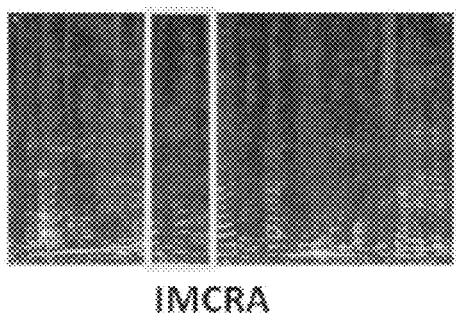
Figure 3E:
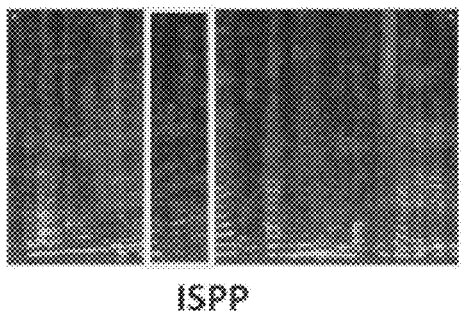

As mentioned above, FIGS. 3A-3E depict spectrograms of a processed utterance using different enhancement approaches, according to embodiments of the present disclosure. In particular, FIGS. 3A and 3B depict spectrograms of the noise and clean speech signals, respectively. FIGS. 3C and 3D depict spectrograms of speech processed by the LSTM-MT with IRM as a suppression rule, and the noise suppressor approach. As shown in FIG. 3C, LSTM-MT approach may destroy the target speech spectrum, while the noise suppressor (FIG. 3D) may be less aggressive and may leave noise and interference unsuppressed. FIG. 3E depicts spectrograms of the speech processed by the LSTM-MT LPS estimation approach with pre-processing. As shown in FIG. 3E, the LSTM-MT LPS estimation approach with pre-processing may obtain the target speech and may suppress the background noise. Accordingly, embodiments of the present disclosure provided advantages of noise suppressors with LSTM deep learning networks.

Turning to the use of a convolutional-recurrent neural network in place of a LSTM deep learning network, the convolutional-recurrent neural network may be utilized to estimate from the enhanced speech both clean speech and the suppression rule. As mentioned above, the convolutional-recurrent neural network may include three components: (i) a convolutional component, which may exploit local patterns in a spectrogram in both spatial and temporal domain; then (ii) a bidirectional recurrent component, which may model dynamic correlations between consecutive frames; and finally (iii) a fully-connected layer that predicts clean spectrograms.

Figure 4:
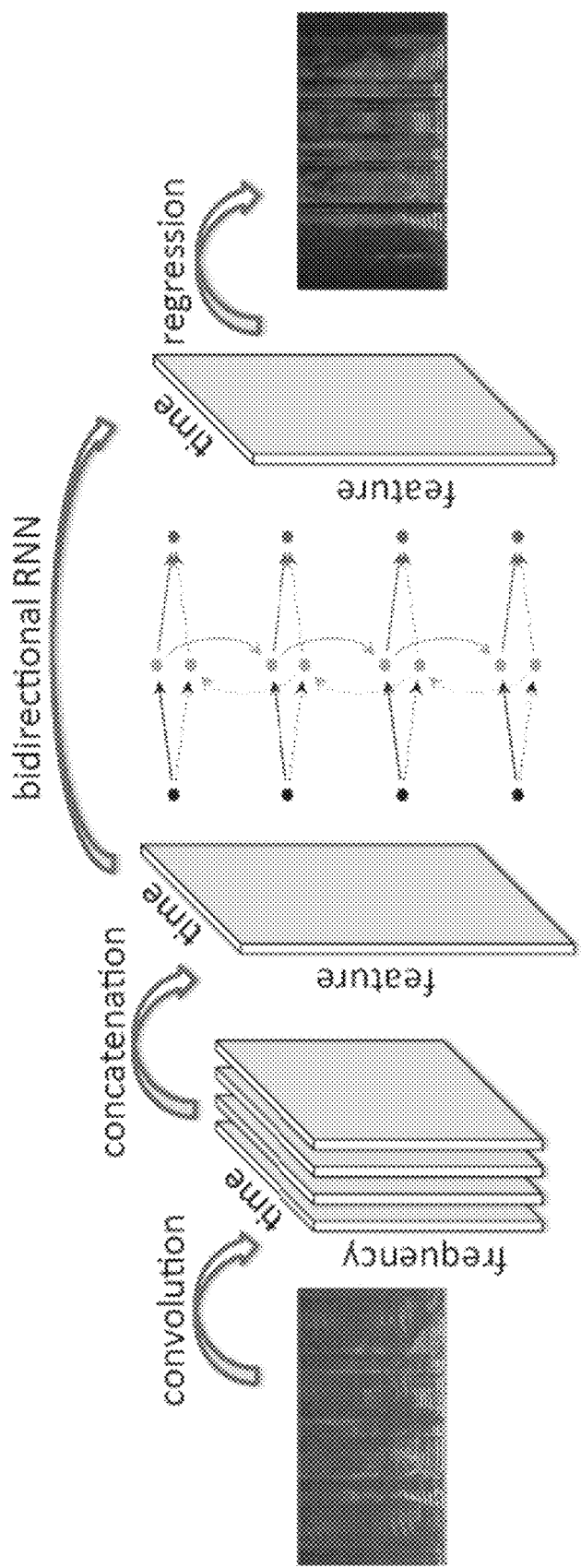
FIG. 4 depicts a model architecture of a convolutional-recurrent neural network, according to embodiments of the present disclosure.

FIG. 4 depicts a model architecture of a convolutional-recurrent neural network, according to embodiments of the present disclosure. In the convolutional component of the convolutional-recurrent neural network, a noisy spectrogram may be convolved with kernels to form feature maps, which are then concatenated to form a 2D feature map. In the bidirectional recurrent component, the 2D feature map may be transformed by a bidirectional RNN along a time dimension. Then, in the last component, a fully-connected network may be used to predict the spectrogram frame-by-frame. Accordingly, the convolutional-recurrent neural network may be trained end-to-end by defining a loss function between the predicted spectrogram and the clean spectrogram.

The convolutional-recurrent neural network may use inductive bias to solve audio enhancement problems. An audio enhancement problem may be a multivariate regression problem, where a nonlinear regression function may be parametrized by the network, as shown in FIG. 4. Alternatively, the whole convolutional-recurrent neural network may be interpreted as a complex filter for noise reduction in the frequency domain.

The problems addressed by the convolutional-recurrent neural network may be formulated as follows: a noisy spectrogram may be $x \in \mathbb{R}_+^{d \times t}$, and its corresponding clean version may be $y \in \mathbb{R}_+^{d \times t}$, where d may be a dimension of each frame (a number of frequency bins in a spectrogram) and t may be a length of the spectrogram. Given a training data set $D=\{(x_i,y_i)\}_{i=1}^n$, of n pairs of noisy and clean spectrograms, the problem of speech enhancement may be formalized as finding a mapping $g_\theta: \mathbb{R}_+^{d \times t} \to \mathbb{R}_+^{d \times t}$ that maps a noisy utterance to a clean one, where $g_\theta$ may be parametrized by $\theta$. Then, the following optimization problem may be solved to find a best model parameter $\theta$ as follows:

$$\min_\theta \frac{1}{2} \sum_{i=1}^n \|g_\theta(x_i) - y_i\|_F^2 \qquad (10)$$

Under this setting, a key is to find a parametric family for denoising function $g_\theta$ such that it is both rich and data-efficient.

The denoising function $g_\theta$ may be multilayer perceptrons ("MLPs"). However, despite being universal function approximators, the fully-connected network structure of MLPs may not exploit rich patterns existing in spectrograms. For example, as shown in FIG. 4, signals in the spectrogram may be continuous along the time dimension, and they may also have similar values in adjacent frequency bins. Thus, convolutional neural networks may be applied to efficiently extract local patterns from an input spectrogram.

$z \in \mathbb{R}^{b \times w}$ may be a convolutional kernel of size b×w, and a feature map $h_z$ may be a convolution of the spectrogram x with kernel z, followed by an elementwise nonlinear mapping $\sigma: h_z(x)=\sigma(x*z)$. $\sigma(a)=\max\{a,0\}$ may be chosen to be a rectified linear function ("ReLU"), as it may be effective in alleviating a gradient vanishing problem. Each such convolutional kernel z may produce a 2D feature map, and k separate convolutional kernels may be applied to the input spectrogram, which may lead to a collection of 2D feature maps $\{h_{z_j}(x)\}_{j=1}^{k}$.

Without padding, with unit stride, the size of each feature map $h_z(x)$ may be $(d-b+1) \times (t-w+1)$. However, in order to recover an original speech signal, the final prediction of the model may have exactly the same length in the time dimension as the input spectrogram. Thus, w may be chosen to be an odd integer and apply a zero-padding of size $d \times \lfloor w/2 \rfloor$ at both sides of x before convolution may be applied to x, which may guarantee that the feature map $h_z(x)$ has $t+2 \times \lfloor w/2 \rfloor - w + 1 = t + w - 1 - w + 1 = t$ t time steps, matching that of x.

Conversely, because of local similarity of a spectrogram in adjacent frequency bins, when convolving with the kernel z, a stride of size b/2 may be used along the frequency dimension. As discussed in detail below, such a design may reduce a number of parameters and computation needed in the recurrent component of the convolutional-recurrent neural network without losing any prediction accuracy.

Thus, the application of convolution kernels may be well suited for speech enhancement in the frequency domain because each kernel may be understood as a nonlinear filter that detects a specific kind of local patterns existing in the noisy spectrograms, and a width of the kernel has a natural interpretation as the length of the context window. Further, on the computational side, since a convolution layer may also be understood as a special case of fully-connected layer with shared and sparse connection weights, the introduction of convolutions may reduce the computation needed by a MLP with the same expressive power.

The bidirectional recurrent component of the convolutional-recurrent neural network may be used to automatically model the dynamic correlations between adjacent frames in the noisy spectrogram. Bidirectional recurrent neural networks ("BRNN") may include recurrent connections in both directions. The output of the convolutional component may be a collection of k feature maps $\{h_{z_j}(x)\}_{j=1}^{k}, h_{z_j}(x) \in \mathbb{R}^{p \times t}$. Before feeding the feature maps into the BRNN, each of the k feature maps may be transformed into a 2D feature map as follows:

$$H(x) = [h_{z_1}(x); \ldots ; h_{z_k}(x)] \in \mathbb{R}^{pk \times t} \quad (11)$$

In other words, $\{h_{z_j}(x)\}_{j=1}^{k}$ may be vertically concatenated along a feature dimension to form a stacked 2D feature map H(x) that includes all the information from the previous convolutional feature map.

In the convolutional-recurrent neural network, deep bidirectional long short-term memory (LSTM), as discussed above, may be used as a recurrent component due to its ability to model long-term interactions. At each time step t, given input $H_t := H_t(x)$, each unidirectional LSTM cell may compute a hidden representation $\vec{H}_t$ using its internal gates as follows:

$$i_t = s(W_{xi}H_t + W_{hi}\vec{H}_{t-1} W_{ci}c_{t-1}) \quad (12)$$

$$f_t = s(W_{xf}H_t + W_{hf}\vec{H}_{t-1} W_{cf}c_{t-1}) \quad (13)$$

$$c_t = f_t \odot c_{t-1} + i_t \odot \tanh(W_{xc}H_t + W_{hc}\vec{H}_{t-1}) \quad (14)$$

$$o_t = s(W_{xo}H_t + W_{ho}\vec{H}_{t-1} + W_{co}c_t) \quad (15)$$

$$\vec{H}_t = o_t \odot \tanh(c_t) \quad (16)$$

Where s(•) is a sigmoid function, ⊙ means elementwise product, and $i_t$, $o_t$ and $f_t$ are the input gate, the output gate, and the forget gate, respectively. The hidden representation $\tilde{H}_t$ of bidirectional LSTM may then be a concatenation of both $\vec{H}_t$ and $\overleftarrow{H}_t$: $\tilde{H}_t = [\vec{H}_t; \overleftarrow{H}_t]$. To build deep bidirectional LSTMs, additional LSTM layers may be stacked on top of each other.

For the fully-connected component of the convolutional-recurrent neural network, $\tilde{H}(x) \in \mathbb{R}^{q \times t}$ may be the output of the bidirectional LSTM layer. To obtain the estimated clean spectrogram, a linear regression with truncation may be applied to ensure the prediction lies in the nonnegative orthant, and thus, for each t, as follows:

$$\hat{y}_t = \max\{0, W\tilde{H}_t + b_W\}, W \in \mathbb{R}^{d \times q}, b_W \in \mathbb{R}^d \quad (17)$$

As discussed, the last step may be to define the mean-squared error between the predicted spectrogram ŷ and the clean one y, and optimize all the model parameters simultaneously. Specifically, AdaDelta with a scheduled learning rate may be used to ensure a stationary solution.

To demonstrate the effectiveness of the convolutional-recurrent neural network ("CRNN") on speech enhancement, a synthetic data set was created, which includes 7,500, 1,500, and 1,500 recordings (clean/noisy speech) for a training data set, a validation data set, and a testing data set, respectively. Each recording was synthesized by convolving a randomly selected clean speech file with one of the 48 room impulse responses available and adding a randomly selected noise file. The clean speech corpus includes 150 files containing ten utterances with male, female, and children voices. The noise dataset consists of 377 recordings representing 25 different types of noise. The room impulse responses were measured for distances between 1 and 3 meters. A secondary noise dataset of 32 files, with noises that do not appear in the training data set, was denoted at unseen noise and used to generate another test data set of 1,500 files. The randomly generated speech and noise levels provides a signal-to-noise ratio between 0 and 30 dB. All files are sampled with 16 kHz sampling rate and stored with 24 bits resolution.

As a preprocessing step, we first use short-time Fourier transform ("STFT") to extract the spectrogram from each utterance, and the spectrogram has 256 frequency bins (d=256) and ~500 frames (t≈500) frames. To thoroughly measure enhancement quality for the convolutional-recurrent neural network on speech enhancement, 5 metrics were used to evaluate different models: signal-to-noise ratio ("SNR", dB), log-spectral distortion ("LSD", dB), mean-squared-error on time domain ("MSE"), word error rate ("WER", %), and the PESQ measure. To measure WER, a DNN-based speech recognizer was used. The system was kept fixed (not fine-tuned) during the experiment. The convolutional-recurrent neural network was compared to various speech enhancement systems, including Microsoft's ("MS") internal speech enhancement system, DNN-SYMM, DNN-CASUAL, and RNN-NG.

MS, Microsoft's internal speech enhancement system used in production, uses a combination of statistical-based enhancement rules. DNN-SYMM includes 3 hidden layers, all of which have 2048 hidden units, and uses a symmetric context window of size 11. DNN-CASUAL, which is similar to DNN-SYMM, includes 3 hidden layers of size 2048, but instead of symmetric context window, and uses causal context window of size 7. RNN-NG is a recurrent neural network with 3 hidden layers of size 500, and the input at each time step covers frames in a context window of length 3.

Table 2 depicts experimental results on the synthetic data set with both seen and unseen noise, evaluated with the 5 different metrics. Noisy speech may correspond to the scores obtained without enhancement, while clean speech may correspond to the scores obtained using the ground truth clean speech. For each metric, the model achieves the best performance is highlighted in bold. In Table 2, as shown below, a comparison is shown with the following metrics signal-to-noise ratio ("SNR") (in dB), log-spectral distortion ("LSD") (in dB), mean square error ("MSE"), word error rate ("WER") in percentage, and perceptual evaluation of speech quality ("PESQ") in a range from 1 to 5 with 1 being poor and 5 being excellent.

TABLE 2

| Model | Seen Noise | | | | | Unseen Noise | | | | |
|---|---|---|---|---|---|---|---|---|---|---|
| | SNR (dB) | LSD (dB) | MSE | WER (%) | PESQ (1-5) | SNR (dB) | LSD (dB) | MSE | WER (%) | PESQ (1-5) |
| Noisy Speech | 15.18 | 23.07 | 0.04399 | 15.40 | 2.26 | 14.78 | 23.76 | 0.04786 | 18.4 | 2.09 |
| MS | 18.82 | 22.24 | 0.03985 | 14.77 | 2.40 | 19.73 | 22.82 | 0.04201 | 15.54 | 2.26 |
| DNN-SYMM | 44.51 | 19.89 | 0.03436 | 55.38 | 2.20 | 40.47 | 21.07 | 0.03741 | 54.77 | 2.16 |
| DNN-CASUAL | 40.70 | 20.09 | 0.03485 | 54.92 | 2.17 | 38.70 | 21.38 | 0.03718 | 54.13 | 2.13 |
| RNN-NG | 41.08 | 17.49 | 0.03533 | 44.93 | 2.19 | 44.60 | 18.81 | 0.03665 | 52.05 | 2.06 |
| CRNN | 49.79 | 15.17 | 0.03399 | 14.64 | 2.86 | 39.70 | 17.06 | 0.04712 | 16.71 | 2.73 |
| Clean Speech | 57.31 | 1.01 | 0.00000 | 2.19 | 4.48 | 58.35 | 1.15 | 0.00000 | 1.83 | 4.48 |

The architecture of the convolutional-recurrent neural network may be as follows: the convolutional component may include 256 kernels of size 32×11, with a stride 16×1 along the frequency and the time dimensions, respectively. Two layers of bidirectional LSTMs may be used following the convolution component, each of which may have 1024 hidden units.

To train the convolutional-recurrent neural network, a number of epochs may be fixed to 200, with a scheduled learning rate {1.0, 0.1, 0.01} for every 60 epochs. For each of the methods, as shown Table 2 above and FIGS. 5B-5E below, the validation data set was used to do early stopping and save the best model on the validation data set for evaluation on the test data set.

The convolutional-recurrent neural network may not over fit, as both weight decay and dropout may hurt the final performance. Deeper convolutional-recurrent neural networks may be used with more layers of bidirectional LSTMs. Further, reducing the stride of convolution in the frequency dimension of the convolutional-recurrent neural network may not significantly boost the performance and may incur additional computations.

As shown in Table 2, on the test data set with seen noise, the convolutional-recurrent neural network may consistently outperform the various speech enhancement systems, including MS, DNN-SYMM, DNN-CASUAL, and RNN-NG. Specifically, the convolutional-recurrent neural network is able to improve the PESQ measure by 0.6 points without decreasing the recognition accuracy, which was unexpected as an underlying ASR system, as a black box and do not fine-tune it during the experiment. As a comparison, while all the various speech enhancement systems may boost the SNR ratio, the various speech enhancement systems may decrease the recognition accuracy. Further, the convolutional-recurrent neural network may also generalize to unseen noise as well, and the convolutional-recurrent neural network may achieve a larger boost (0.64) on the perceptual quality while at the same time may increase the recognition accuracy.

The denoised spectrograms from different models are visualized to provide a better understanding on the experimental result. FIGS. 5A-5F depict noisy and clean spectrograms, along with the denoised spectrograms using different models, according to embodiments of the present disclosure. Specifically, FIGS. 5A and 5F depict a noisy speech spectrogram and a clean speech spectrogram, respectively.

As shown in FIG. 5B, the denoised spectrogram of MS may be the most conservative algorithm among the convolutional-recurrent neural network and the other various speech enhancement systems. By not removing much noise, the MS algorithm may also keep most of the real signals in the speech. However, although DNN-based approaches may remove background noise, DNN-based approaches may also remove the real speech signals from the spectrogram. Thus, DNN-based approaches may degrade the recognition accuracies, as shown in Table 2. RNN-based approaches may improve over DNN-based approaches, but RNN-based approaches may also fail to keep the real signals in low frequency bins. As shown in FIG. 5E, the convolutional-recurrent neural network may provide improved removal of background noise and may preserve the clean speech signals. Compared to FIGS. 5C and 5D, which show denoised spectrograms for a DNN-based approach and a RNN-based approach, respectively, the convolutional-recurrent neural network may prove improved preservation of high/low-frequency bins, and improved removal of background noise, as compared to the MS algorithm, as shown in FIG. 5B. Further, the convolutional-recurrent neural network may produce a denoised spectrogram that most closely matches to the ground-truth clean spectrogram, as shown in FIG. 5F.

According to embodiments of the present disclosure, the convolutional-recurrent neural network combines both convolutional and recurrent neural networks for speech enhancement. The inductive bias of the convolutional-recurrent neural network may be well-suited to solve speech enhancement because the convolution kernels may efficiently detect local patterns in spectrograms and the bidirectional recurrent connections may automatically model the dynamic correlations between adjacent frames. Due to the sparse nature of convolutions, the convolutional-recurrent neural network may require less computations than both MLPs and RNNs. As discussed above, the experimental results may indicate that the convolutional-recurrent neural network may outperform other various speech enhancement systems, including MS, DNN-SYMM, DNN-CASUAL, and RNN-NG, on five different metrics, and the convolutional-recurrent neural network may be able to generalize to unseen noises, which may confirm the effectiveness of the convolutional-recurrent neural network in speech enhancement.

While the present disclosure specifically discusses audio processing, aspects of the present disclosure may be applicable not only to audio processing, such as speech enhancement, but may also be applicable to voice activity protection, regressive processing, and classification problems. For example, aspects of the present disclosure may also improve classification tasks, such as source separation and microphone beam forming, as well as estimation tasks, such as acoustic echo cancellation.

As described above and below, embodiments of the present disclosure allow for reduction in computational complexity and memory demand, which may also reduce power consumption. Embodiments of the present disclosure may be implemented on mobile devices, such as Smartphones, tablets, and/or even wearable items, smart speakers, computers, laptops, car entertainment systems, etc.

Figure 6:
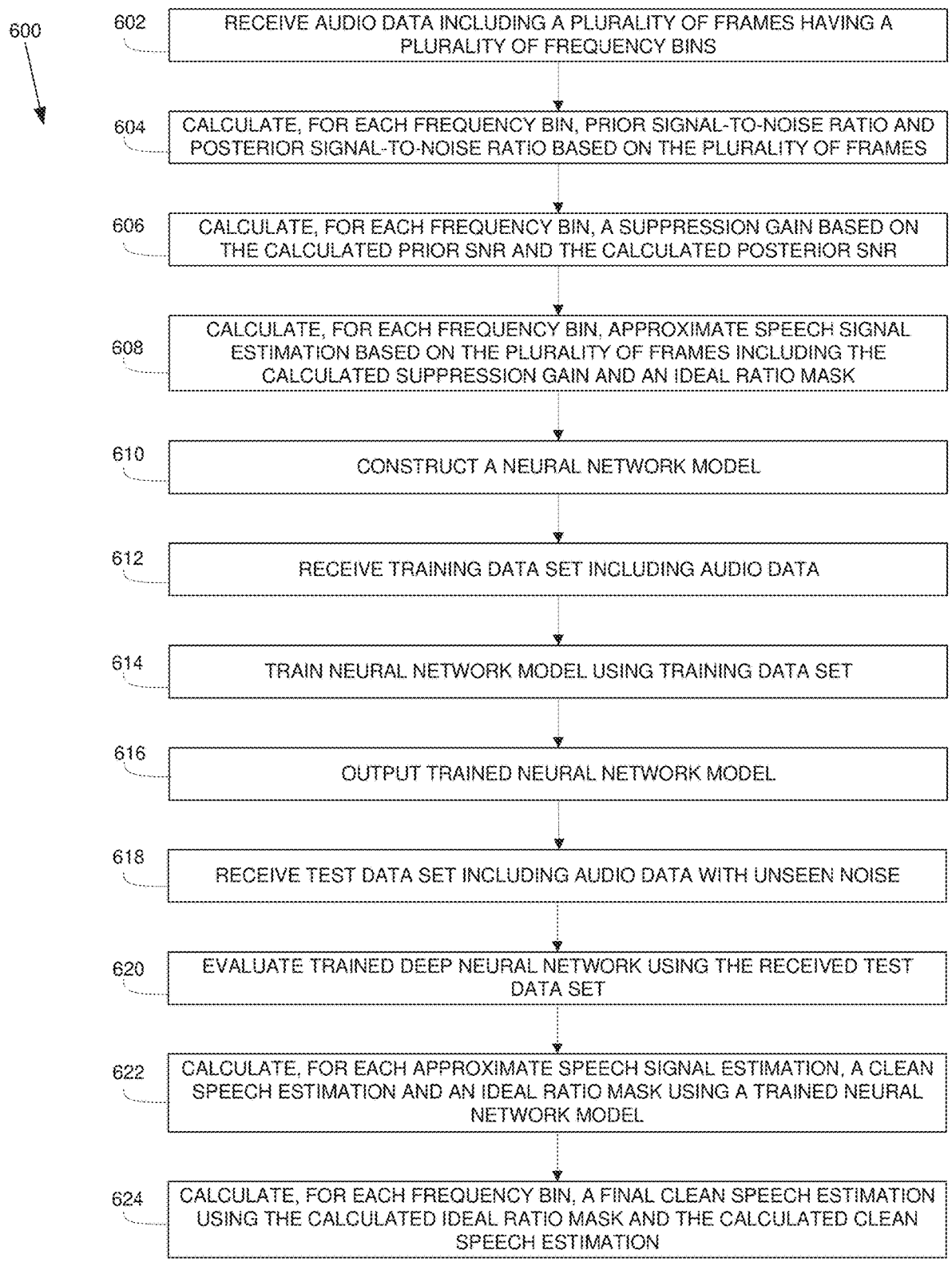
FIG. 6 depicts a method 600 for training a deep neural network for improved real-time audio processing, according to embodiments of the present disclosure.

FIG. 6 depicts a method 600 for improved real-time audio processing, according to embodiments of the present disclosure. Method 600 may begin at step 602, in which audio data including a plurality of frames having a plurality of frequency bins may be received. As mentioned above, the audio data, such as real-time audio data may be received, and the audio data may include one or more audio frames represented in one of a time domain or a conversion domain. The audio data may be in a time domain, and may be subsequently converted into a frequency domain. For example, a time domain signal may be converted into several frequency dependent domains. Further, a time domain signal may be converted into one or more of conversion domains, such as one or more of a frequency domain, a modified complex lapped transform ("MOLT") domain, a mel-filter bank domain, etc. Further, the one or more conversion domains may further be converted into one or more conversion domains, such as one or more of a modulation domain, a cepstral domain, a mel-frequency cepstral coefficient ("MFCC") domain, a log-power frequency domain, etc. Further, after processing the audio data, if the audio data is represented in a conversion domain, the audio data may be converted into the time domain.

Then, at step 604, for each frequency bin, a prior signal-to-noise ratio and a posterior signal-to-noise ratio based on the plurality of frames may be calculated. At step 606, for each frequency bin, a suppression gain based on the calculated prior signal-to-noise ratio and the calculated posterior signal-to-noise ratio may be calculated. For each frequency bin, the approximate speech signal estimation based on the plurality of frames including the calculated suppression gain and an ideal ratio mask may be calculated at step 608.

At step 610, a neural network model, including a plurality of neurons, configured to output the clean speech estimation and the ideal ratio mask of audio data, the plurality of neurons arranged in a plurality of layers, including at least one hidden layer, and being connected by a plurality of connections may be constructed. The at least one hidden layer of the neural network model may comprise at least one long short-term memory layer. Of course, construction of the neural network model may any time before use of the neural network model, and construction of the neural network model may not be limited to occurring before and/or after at least the above calculations on audio data.

At step 612, a training data set including audio data may be received. The training data set may comprise a synthetic data set with separately known clean speech and noise signals for training. Then, at step 614, the neural network model may be trained using the training data set. Training the neural network model using the training data set may comprise training the neural network model using a log-power spectra of a training data set as input features and a clean log-power spectra and reference ideal ratio mask. Training the neural network model using the training data set may comprise minimizing a mean square error between both the log-power spectra and the clean log-power spectra and the calculated ideal ratio mask and the reference ideal ratio mask. Once the neural network model is trained, at step 616, the trained neural network model configured to output the clean speech estimation and the ideal ratio mask of audio data may be outputted.

The trained neural network model may comprise a recurrent neural-network based on at least one long short-term memory layer. Alternatively, and/or additionally, the trained neural network model may comprise a convolutional-recurrent neural network model. The convolutional-recurrent neural network model may include a convolutional component, at least one bidirectional recurrent component, and a fully-connected layer. The convolutional component may exploit local patterns in a spectrogram in both a spatial domain and a temporal domain, the at least one bidirectional recurrent component may model dynamic correlations between consecutive frames, and the fully-connected layer may predict clean spectrograms.

The convolutional component may convolve a noisy spectrogram with kernels to form feature maps, and the convolutional component may concatenate the formed feature maps to form a 2D feature map. The bidirectional recurrent component may transform the 2D feature map by a bidirectional recurrent neural network along a time dimension. Additionally, and/or alternatively, the bidirectional recurrent component may automatically model dynamic correlations between adjacent frames in a noisy spectrogram by using a bidirectional recurrent neural network that includes recurrent connections in both directions.

Once the trained neural network model is outputted, at step 618, a test data set including audio data with unseen noise may be received. Then at step 620, the trained deep neural network using the received test data set may be evaluated. Alternatively, steps 618 and 620 may be omitted, and/or may be performed at a different time. Once evaluated to pass a predetermined threshold, the trained deep neural network may be utilized. Additionally, in certain embodiments of the present disclosure, the step of method 600 may be repeated to produce a plurality of trained deep neural networks. The plurality of trained deep neural networks may then be compared to each other and/or other deep neural networks.

At step 622, for each approximate speech signal estimation, a clean speech estimation and an ideal ratio mask using a trained neural network model may be calculated. The ideal ratio mask may be calculated based on a proportion of powers of a clean speech to a noisy speech in a corresponding time-frequency bin. Finally, at step 624, for each frequency bin, a final clean speech estimation may be calculated using the calculated ideal ratio mask and the calculated clean speech estimation.

Figure 7:
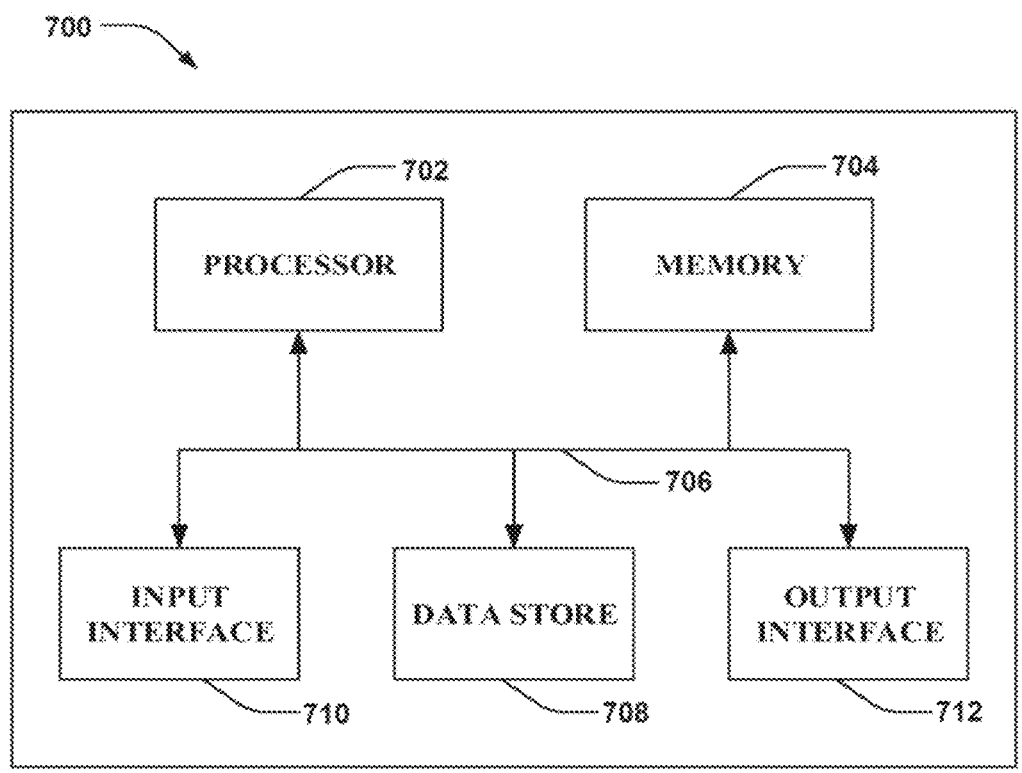
FIG. 7 depicts a high-level illustration of an exemplary computing device that may be used in accordance with the systems, methods, and computer-readable media disclosed herein, according to embodiments of the present disclosure.

FIG. 7 depicts a high-level illustration of an exemplary computing device 700 that may be used in accordance with the systems, methods, modules, and computer-readable media disclosed herein, according to embodiments of the present disclosure. For example, the computing device 700 may be used in a system that processes data, such as audio data, using a deep neural network, according to embodiments of the present disclosure. The computing device 700 may include at least one processor 702 that executes instructions that are stored in a memory 704. The instructions may be, for example, instructions for implementing functionality described as being carried out by one or more components discussed above or instructions for implementing one or more of the methods described above. The processor 702 may access the memory 704 by way of a system bus 706. In addition to storing executable instructions, the memory 704 may also store data, audio, one or more deep neural networks, and so forth.

The computing device 700 may additionally include a data store, also referred to as a database, 708 that is accessible by the processor 702 by way of the system bus 706. The data store 708 may include executable instructions, data, examples, features, etc. The computing device 700 may also include an input interface 710 that allows external devices to communicate with the computing device 700. For instance, the input interface 710 may be used to receive instructions from an external computer device, from a user, etc. The computing device 700 also may include an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 1000 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for example, several devices may be in communication by way of a network connection and may collectively perform tasks described as being performed by the computing device 700.

Figure 8:
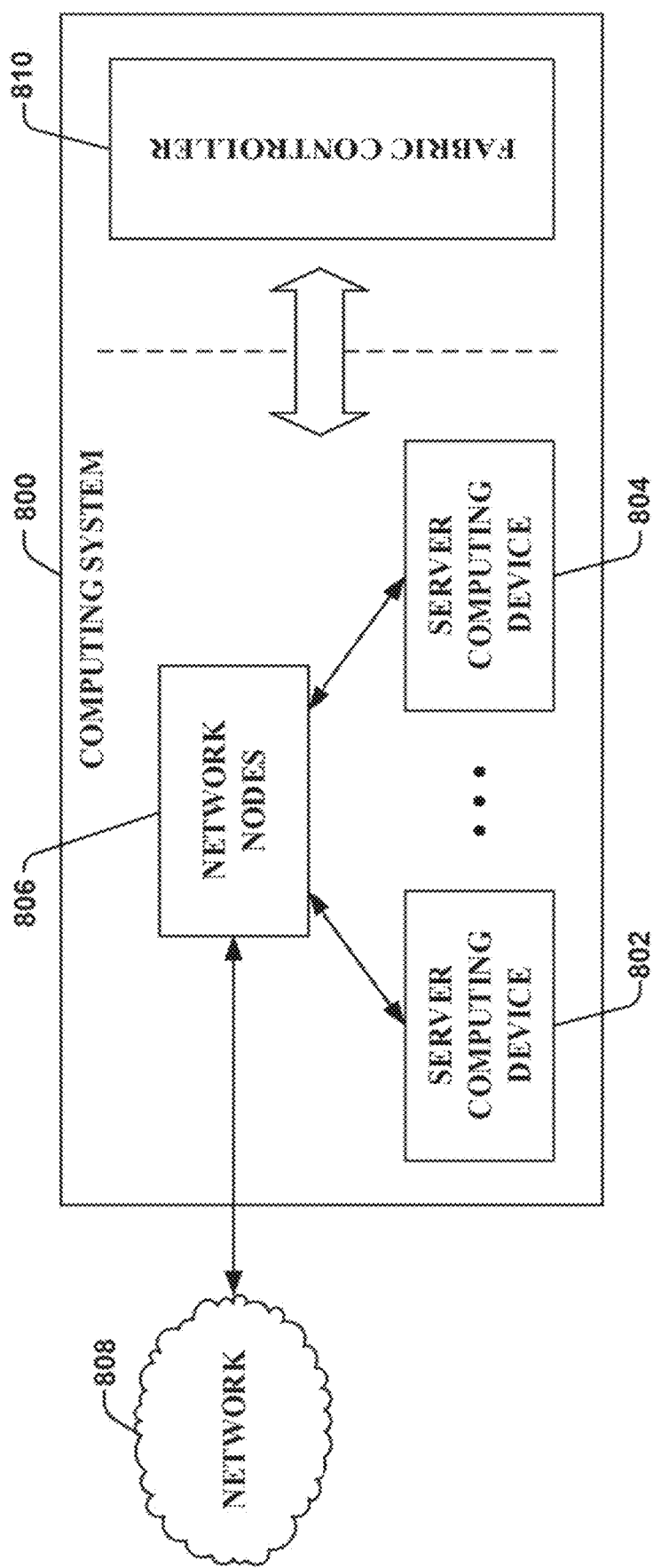
FIG. 8 depicts a high-level illustration of an exemplary computing system that may be used in accordance with the systems, methods, and computer-readable media disclosed herein, according to embodiments of the present disclosure.

Turning to FIG. 8, FIG. 8 depicts a high-level illustration of an exemplary computing system 800 that may be used in accordance with the systems, methods, modules, and computer-readable media disclosed herein, according to embodiments of the present disclosure. For example, the computing system 800 may be or may include the computing device 700. Additionally, and/or alternatively, the computing device 700 may be or may include the computing system 800.

The computing system 800 may include a plurality of server computing devices, such as a server computing device 802 and a server computing device 804 (collectively referred to as server computing devices 802-804). The server computing device 802 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 802, at least a subset of the server computing devices 802-804 other than the server computing device 802 each may respectively include at least one processor and a memory. Moreover, at least a subset of the server computing devices 802-804 may include respective data stores.

Processor(s) of one or more of the server computing devices 802-804 may be or may include the processor, such as processor 702. Further, a memory (or memories) of one or more of the server computing devices 802-804 can be or include the memory, such as memory 704. Moreover, a data store (or data stores) of one or more of the server computing devices 802-804 may be or may include the data store, such as data store 708.

The computing system 800 may further include various network nodes 806 that transport data between the server computing devices 802-804. Moreover, the network nodes 806 may transport data from the server computing devices 802-804 to external nodes (e.g., external to the computing system 800) by way of a network 808. The network nodes 802 may also transport data to the server computing devices 802-804 from the external nodes by way of the network 808. The network 808, for example, may be the Internet, a cellular network, or the like. The network nodes 806 may include switches, routers, load balancers, and so forth.

A fabric controller 810 of the computing system 800 may manage hardware resources of the server computing devices 802-804 (e.g., processors, memories, data stores, etc. of the server computing devices 802-804). The fabric controller 810 may further manage the network nodes 806. Moreover, the fabric controller 810 may manage creation, provisioning, de-provisioning, and supervising of managed runtime environments instantiated upon the server computing devices 802-804.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improved real-time audio processing, the method comprising:
    receiving audio data including a plurality of frames having a plurality of frequency bins;
    calculating, for each frequency bin, an approximate speech signal estimation based on the plurality of frames;
    calculating, for each approximate speech signal estimation, a clean speech estimation and at least one additional target including an ideal ratio mask using a trained convolutional-recurrent neural network model, the trained convolutional-recurrent neural network model including a convolutional component, at least one bidirectional recurrent component, and a fully-connected layer, wherein the bidirectional recurrent component automatically models dynamic correlations between adjacent frames in a noisy spectrogram by using a bidirectional recurrent neural network that includes recurrent connections in both directions; and
    calculating, for each frequency bin, a final clean speech estimation using the calculated at least one additional target including the calculated ideal ratio mask and the calculated clean speech estimation.

2. The method of claim 1, further comprising:
    calculating, for each frequency bin, a prior signal-to-noise ratio and a posterior signal-to-noise ratio based on the plurality of frames; and
    calculating, for each frequency bin, a suppression gain based on the calculated prior signal-to-noise ratio and the calculated posterior signal-to-noise ratio,
    wherein calculating, for each frequency bin, the approximate speech signal estimation based on the plurality of frames includes:
        calculating, for each frequency bin, the approximate speech signal estimation based on the calculated suppression gain and the ideal ratio mask.

3. The method of claim 2, wherein the ideal ratio mask is calculated based on a proportion of powers of a clean speech to a noisy speech in a corresponding time-frequency bin.

4. The method of claim 1, wherein the trained convolutional-recurrent neural network model further includes at least one long short-term memory layer.

5. The method according to claim 1, further comprising:
    constructing a convolutional-recurrent neural network model, including a plurality of neurons, configured to output the clean speech estimation and the ideal ratio mask of audio data, the plurality of neurons arranged in a plurality of layers, including at least one hidden layer, and being connected by a plurality of connections;
    receiving a training data set, the training data set including audio data;
    training the convolutional-recurrent neural network model using the training data set; and
    outputting the trained convolutional-recurrent neural network model configured to output the clean speech estimation and the ideal ratio mask of audio data.

6. The method according to claim 5, wherein the at least one hidden layer of the convolutional-recurrent neural network model comprises at least one long short-term memory layer.

7. The method according to claim 5, wherein training the convolutional-recurrent neural network model using the training data set comprises:
    training the convolutional-recurrent neural network model using one or both of (i) a log-power spectra of a training data set and (ii) a linear-power spectra of a training data set as input features and one or both of (i) a clean log-power spectra and (ii) a clean linear-power spectra and reference ideal ratio mask.

8. The method according to claim 5, wherein the training data set comprises a synthetic data set with separately known clean speech and noise signals for training.

9. The method according to claim 7, wherein training the convolutional-recurrent neural network model further comprises:
    minimizing a mean square error between one of (i) both the log-power spectra and the clean log-power spectra and the calculated ideal ratio mask and the reference ideal ratio mask, or (ii) both the linear-power spectra and the clean linear-power spectra and the calculated ideal ratio mask and the reference ideal ratio mask.

10. The method according to claim 1, further comprising:
    receiving a test data set, the test data set including audio data with unseen noise; and
    evaluating the trained convolutional-recurrent neural network using the received test data set.

11. The method according to claim 1, wherein the convolutional component exploits local patterns in a spectrogram in both a spatial domain and a temporal domain,
    wherein the at least one bidirectional recurrent component models dynamic correlations between consecutive frames, and
    wherein the fully-connected layer predicts clean spectrograms.

12. The method according to claim 1, wherein the convolutional component convolves a noisy spectrogram with kernels to form feature maps, and the convolutional component concatenates the formed feature maps to form a 2D feature map.

13. The method according to claim 12, wherein the bidirectional recurrent component transforms the 2D feature map by a bidirectional recurrent neural network along a time dimension.

14. A system for improved real-time audio processing, the system including:
    a data storage device that stores instructions for improved real-time audio processing; and
    a processor configured to execute the instructions to perform a method including:

receiving audio data including a plurality of frames having a plurality of frequency bins;

calculating, for each frequency bin, an approximate speech signal estimation based on the plurality of frames;

calculating, for each approximate speech signal estimation, a clean speech estimation and at least one additional target including an ideal ratio mask using a trained convolutional-recurrent neural network model, the trained convolutional-recurrent neural network model including a convolutional component, at least one bidirectional recurrent component, and a fully-connected layer, wherein the bidirectional recurrent component automatically models dynamic correlations between adjacent frames in a noisy spectrogram by using a bidirectional recurrent neural network that includes recurrent connections in both directions; and calculating, for each frequency bin, a final clean speech estimation using the calculated at least one additional target including the calculated ideal ratio mask and the calculated clean speech estimation.

15. The system according to claim 14, wherein the processor is further configured to execute the instructions to perform the method including:

calculating, for each frequency bin, a prior signal-to-noise ratio and a posterior signal-to-noise ratio based on the plurality of frames; and calculating, for each frequency bin, a suppression gain based on the calculated prior signal-to-noise ratio and the calculated posterior signal-to-noise ratio, wherein calculating, for each frequency bin, the approximate speech signal estimation based on the plurality of frames includes:

calculating, for each frequency bin, the approximate speech signal estimation based on the calculated suppression gain and the ideal ratio mask.

16. The system according to claim 14, wherein the convolutional component exploits local patterns in a spectrogram in both a spatial domain and a temporal domain, wherein the at least one bidirectional recurrent component models dynamic correlations between consecutive frames, and wherein the fully-connected layer predicts clean spectrograms.

17. A computer-readable storage device storing instructions that, when executed by a computer, cause the computer to perform a method for improved real-time audio processing, the method including:

receiving audio data including a plurality of frames having a plurality of frequency bins;

calculating, for each frequency bin, an approximate speech signal estimation based on the plurality of frames;

calculating, for each approximate speech signal estimation, a clean speech estimation and at least one additional target including an ideal ratio mask using a trained convolutional-recurrent neural network model, the trained convolutional-recurrent neural network model including a convolutional component, at least one bidirectional recurrent component, and a fully-connected layer, wherein the bidirectional recurrent component automatically models dynamic correlations between adjacent frames in a noisy spectrogram by using a bidirectional recurrent neural network that includes recurrent connections in both directions; and calculating, for each frequency bin, a final clean speech estimation using the calculated at least one additional target including the calculated ideal ratio mask and the calculated clean speech estimation.

18. The computer-readable storage device according to claim 17, wherein the method further comprises:

calculating, for each frequency bin, a prior signal-to-noise ratio and a posterior signal-to-noise ratio based on the plurality of frames; and calculating, for each frequency bin, a suppression gain based on the calculated prior signal-to-noise ratio and the calculated posterior signal-to-noise ratio, wherein calculating, for each frequency bin, the approximate speech signal estimation based on the plurality of frames includes:

calculating, for each frequency bin, the approximate speech signal estimation based on the calculated suppression gain and the ideal ratio mask.

19. The computer-readable storage device according to claim 17, wherein the convolutional component convolves a noisy spectrogram with kernels to form feature maps, and the convolutional component concatenates the formed feature maps to form a 2D feature map.

20. The computer-readable storage device according to claim 19, wherein the bidirectional recurrent component transforms the 2D feature map by a bidirectional recurrent neural network along a time dimension.

* * * * *